(12) United States Patent
Tsunoda (10) Patent No.: US 9,914,431 B2
(45) Date of Patent: Mar. 13, 2018

(54) VEHICLE SEAT ASSEMBLY FOR THEFT PREVENTION

(71) Applicant: Nissan North America, Inc., Franklin, TN (US)

(72) Inventor: Hiroyasu Tsunoda, México City (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 251 days.

(21) Appl. No.: 14/928,912

(22) Filed: Oct. 30, 2015

(65) Prior Publication Data
US 2017/0120863 A1  May 4, 2017

(51) Int. Cl.
| | |
|---|---|
| B60R 25/01 | (2013.01) |
| B60N 2/20 | (2006.01) |
| B60R 25/10 | (2013.01) |
| B60R 25/20 | (2013.01) |
| B60N 2/08 | (2006.01) |

(52) U.S. Cl.
CPC ............ *B60R 25/014* (2013.01); *B60N 2/08* (2013.01); *B60N 2/20* (2013.01); *B60R 25/10* (2013.01); *B60R 25/20* (2013.01); *B60R 25/2036* (2013.01)

(58) Field of Classification Search
CPC . B60R 23/014; B60R 25/014; B60R 25/2036; B60R 25/20; B60R 25/10; B60N 2/20; B60N 2/08
USPC ......................................................... 297/341
See application file for complete search history.

(56) References Cited

U.S. PATENT DOCUMENTS

| | | | | |
|---|---|---|---|---|
| 5,213,388 A * | 5/1993 | Baker | ................. | B60N 2/0717 180/287 |
| 5,412,964 A * | 5/1995 | Yee | ......................... | B60N 2/20 297/378.14 |
| 6,048,019 A * | 4/2000 | Tauber | ..................... | B60N 2/12 248/429 |
| 6,074,009 A * | 6/2000 | Farino | ..................... | B60N 2/12 297/341 |
| 6,382,694 B1* | 5/2002 | Rankin | ................ | B60N 2/0232 180/287 |

FOREIGN PATENT DOCUMENTS

| | | | | |
|---|---|---|---|---|
| CA | 2232882 A1 * | 9/1999 | .......... | B60R 25/014 |
| DE | 3732739 A1 * | 4/1989 | .............. | B60N 2/20 |
| DE | 4341464 A1 * | 6/1995 | .............. | B60N 2/20 |

* cited by examiner

*Primary Examiner* — Milton Nelson, Jr.
(74) *Attorney, Agent, or Firm* — Global IP Counselors, LLP (57) ABSTRACT

A vehicle seat assembly comprising a seat bottom, a seat bottom release, a seat back, a seat back release, and a locking assembly. Upon activation of the seat bottom release, the seat bottom can move along a seat bottom travel path in a longitudinal direction of the vehicle to a forward position close to an instrument panel of the vehicle. Upon activation of the seat back release, the seat back can pivot to a forward position close to the seat bottom. The locking assembly can operate to lock the seat bottom, the seat back, or both, in their respective forward positions such that the seat bottom, the seat back, or both, obstruct operational access to a user operational component, such as the steering wheel or glove box door, on the instrument panel.

18 Claims, 8 Drawing Sheets

VEHICLE SEAT ASSEMBLY FOR THEFT PREVENTION

BACKGROUND

Field of the Invention

The present invention generally relates to a vehicle seat assembly for theft prevention. More particularly, the present invention relates to a vehicle seat assembly in which the seat back, the seat bottom, or both, can be positioned and locked into respective positions in which the seat bottom, the seat back, or both, obstructs operational access to a user operational component, such as a steering wheel or glove box, on the instrument panel Background Information Vehicle theft has been an ongoing problem for many years. In an attempt to combat vehicle theft, many devices have been developed, such as improved door locks, steering wheel locking devices, sophisticated alarm systems and so on. However, once a thief has been able to circumvent the alarm system or locking devices, the thief can drive the vehicle away. Thieves are also typically very capable of circumventing the locking system on, for example, the vehicle glove box to gain access to the contents of the vehicle glove box, even without stealing the vehicle.

Accordingly, a need exists for an improved vehicle anti-theft system.

SUMMARY

In accordance with one aspect of the present invention, a vehicle seat assembly comprises a seat bottom, a seat bottom release, a seat back, a seat back release, and a locking assembly. The seat bottom has an upper seat bottom surface facing toward an interior roof of a vehicle and movably coupled to an interior floor of the vehicle to move along a seat bottom travel path in a longitudinal direction of the vehicle between a forward position and a rearward position, with the forward position being closer to an instrument panel of the vehicle than the rearward position. The seat bottom release is configured to change between a released condition that enables the seat bottom to move along the seat bottom travel path and a set condition that releasably sets the seat bottom at a location along the seat bottom travel path. The seat back has a forward seat back surface and is pivotally coupled with respect to the seat bottom to pivot along a seat back pivot path between a first position at which the seat back extends at a first angle with respect to the seat bottom with the forward seat back surface being proximate to and facing the upper seat bottom surface and a second position at which the seat back extends an a second angle, greater than the first angle, with respect to the seat bottom with the forward seat back surface facing the instrument panel. The seat back release is configured to change between a released condition that enables the seat back to move along the seat back pivot path and a set condition that releasably sets the seat back at a location along the seat back pivot path. The locking assembly is configured to lock at least one of the seat bottom while the seat bottom is in the forward position and the seat back while the seat back is in the first position such that at least one of the seat bottom and the seat back obstructs operational access to a user operational component on the instrument panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 6 through 10 illustrate exemplary components of a locking mechanism employed in the vehicle seat assembly for theft prevention according to a disclosed embodiment, with FIG. 7 illustrating an exemplary plan view of a key assembly, FIG. 8 illustrating an exemplary perspective view of the locking mechanism positioned in the unlocked position, FIG. 9 illustrating an exemplary cross-sectional view of the locking mechanism being moved from the unlocked position to the locked position by the key locking component, and FIG. 10 illustrating an exemplary perspective view of the locking mechanism positioned in the unlocked position;

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
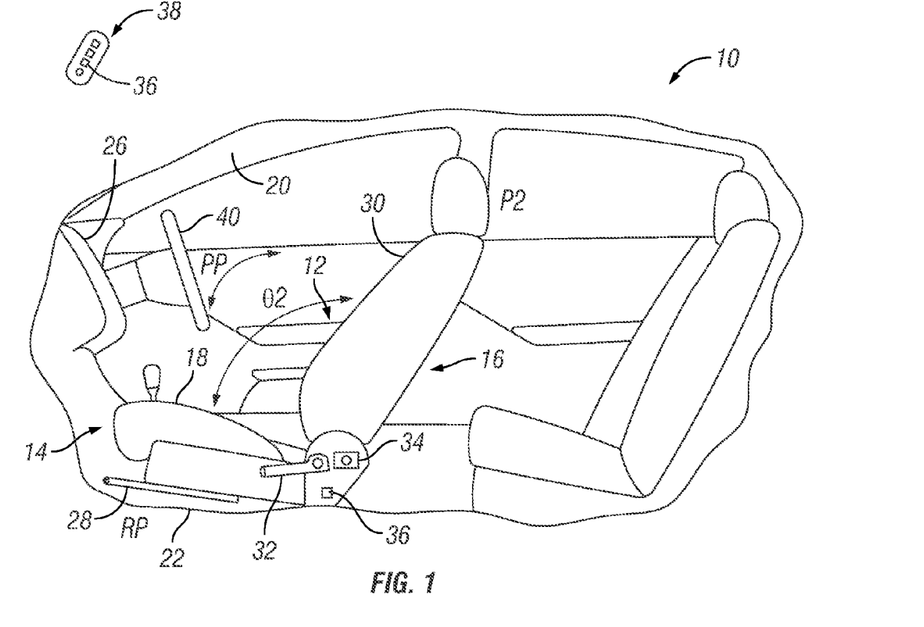
FIG. 1 is a driver side view illustrating an example of a vehicle equipped with a vehicle seat assembly for theft prevention according to a disclosed embodiment.
Figure 2:
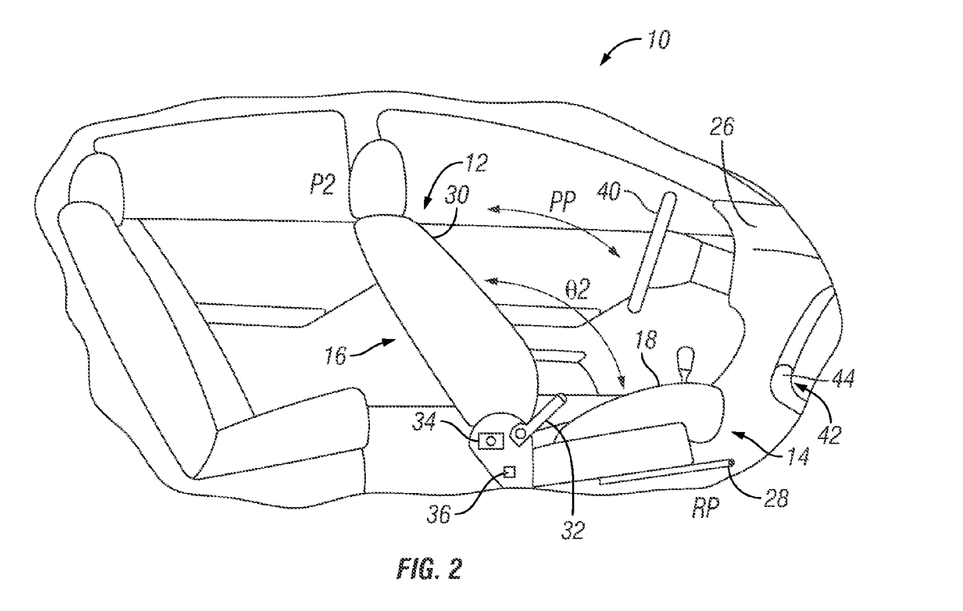
FIG. 2 is a passenger side view illustrating an example of a vehicle equipped with a vehicle seat assembly for theft prevention according to a disclosed embodiment.
Figure 3:
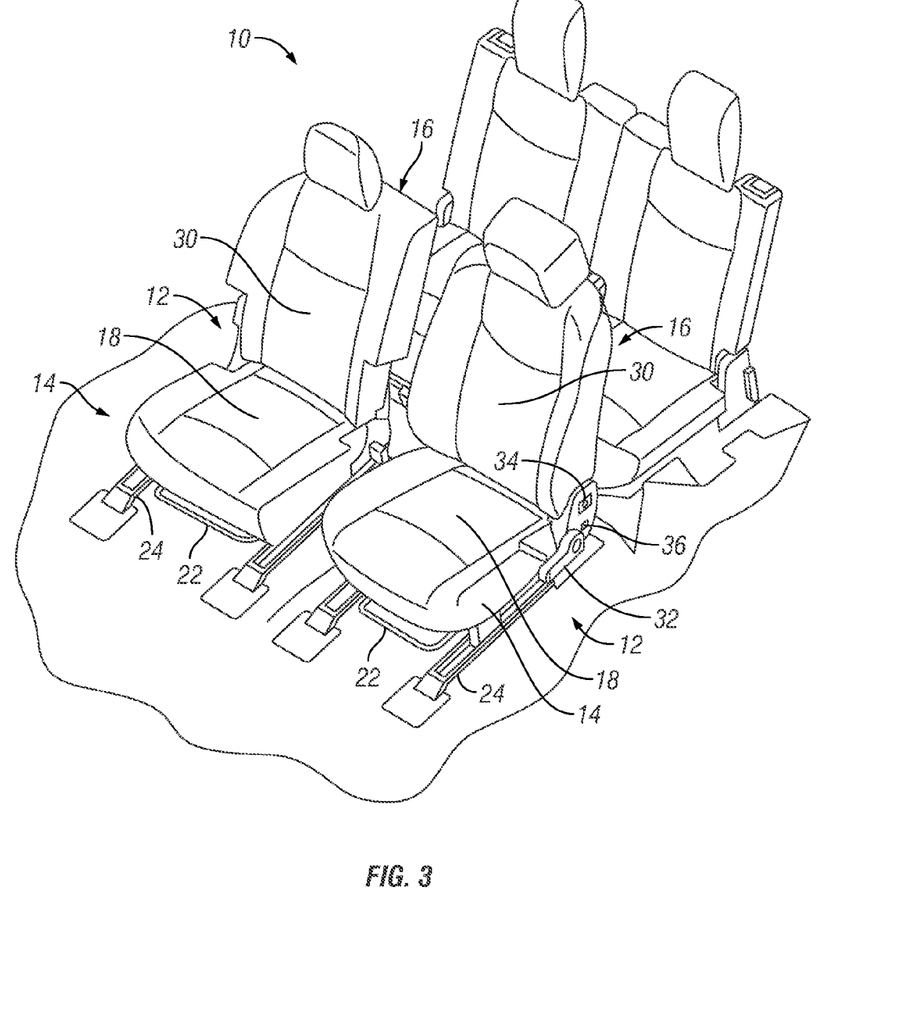
FIG. 3 is a perspective view illustrating an example of a vehicle equipped with a vehicle seat assembly for theft prevention according to a disclosed embodiment.

FIGS. 1 through 3 illustrate an example of a vehicle 10 equipped with a vehicle seat assembly 12 according to a disclosed embodiment. As can be appreciated from the figures, the vehicle seat assemblies 12 on the driver side and the passenger side are essentially identical and mirror images of each other.

The vehicle seat assembly 12 comprises a seat bottom 14 and a seat back 16 which can be configured as any conventional type of seat bottom 14 and seat back 16 that is pivotally attached to the seat bottom 14 as known in the art. The seat bottom 14 has an upper seat bottom surface 18 facing toward an interior roof 20 of the vehicle 10. The seat bottom 14 can be movably coupled to an interior floor 22 of the vehicle 10 by, for example, seat rails 24 or in any other suitable manner as known in the art. Thus, the seat bottom 14 and the attached seat back 16 can move along a seat bottom travel path T in a longitudinal direction L of the vehicle 10 between a forward position FP and a rearward position RP (see also FIGS. 5 and 6). As indicated, the forward position FP is closer to an instrument panel 26 of the vehicle 10 than the rearward position RP.

The vehicle seat assembly 12 further comprises a seat bottom release 28 that is configured to change between a released condition that enables the seat bottom 14 to move along the seat bottom travel path T and a set condition that releasably sets the seat bottom 14 at a location along the seat bottom travel path T. As understood in the cart, the seat bottom release 28 can be configured as a lever arrangement that is manually operated to release the seat bottom 14 for movement, or can be configured as an electronically controlled mechanism having a motor assembly (not shown), such as a conventional vehicle seat motor assembly for driving the seat bottom 14 between the forward position FP and the rearward position RP.

Figure 5:
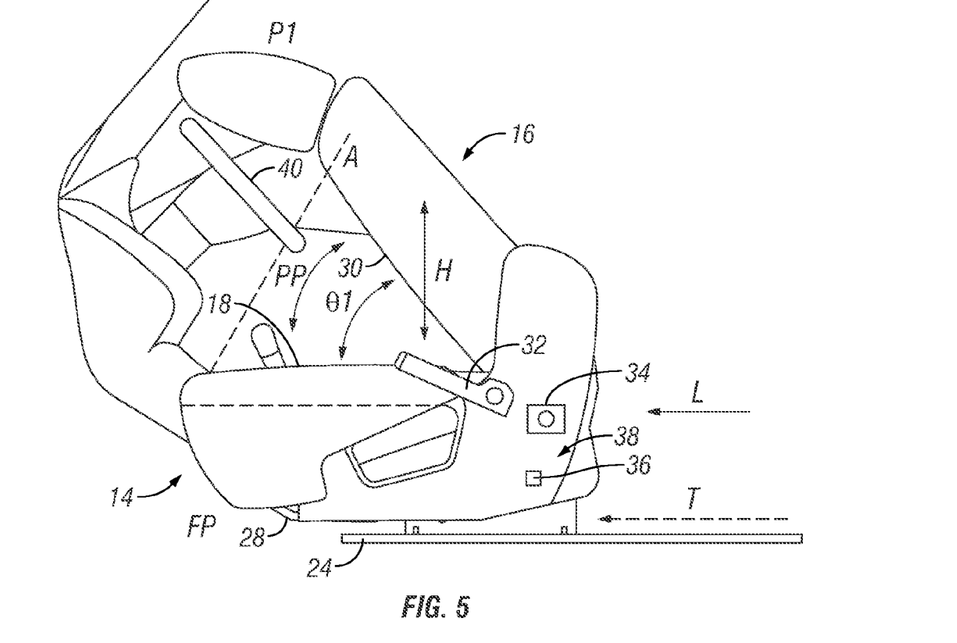
FIG. 5 is a driver side view illustrating an example of the vehicle seat bottom and vehicle seat back locked in positions to obstruct operational access to the steering wheel according to a disclosed embodiment.
Figure 6:
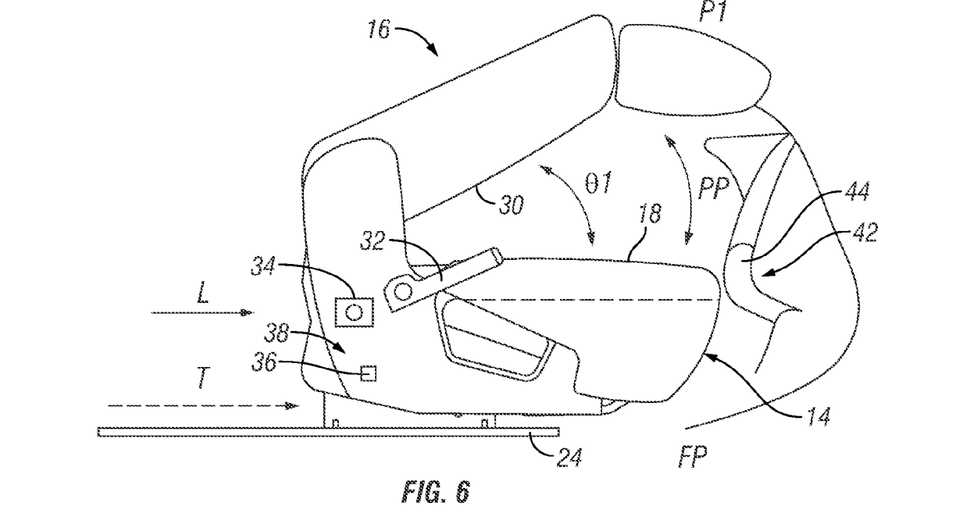
FIG. 6 is a passenger side view illustrating an example of the vehicle seat bottom and vehicle seat back locked in positions to obstruct operational access to the glove box according to a disclosed embodiment.

The seat back 16 has a forward seat back surface 30 and is pivotally coupled with respect to the seat bottom 14 in any suitable or conventional manner to pivot along a seat back pivot path PP between a first position P1 at which the seat back 16 extends at a first angle θ1 with respect to the seat bottom 14 with the forward seat back surface 30 being proximate to and facing the upper seat bottom surface 18 and a second position P2 at which the seat back 16 extends an a second angle θ2, greater than the first angle θ1, with respect to the seat bottom 14 with the forward seat back surface 30 facing the instrument panel 26 (see also FIGS. 5 and 6).

The vehicle seat assembly 12 further comprises a seat back release 32 that is configured to change between a released condition that enables the seat back 16 to move along the seat back pivot path P and a set condition that releasably sets the seat back 16 at a location along the seat back pivot path P. As with the seat bottom release 28, the seat back release 32 can be configured as a lever arrangement that is manually operated to release the seat back 16 for movement, or can be configured as an electronically controlled mechanism having a motor assembly (not shown), such as a conventional vehicle seat motor assembly for driving the seat back 16 between the first position P1 and the second position P2.

The vehicle seat assembly 12 further comprises a locking assembly 34 configured to lock the seat bottom 14 while the seat bottom 14 is in the forward position FP, to lock the seat back 16 while the seat back is in the first position P1, or lock both the seat bottom 14 in the forward position FP and the seat back 16 in the first position P1. By doing this, the seat bottom 14, the seat back 16, or both the seat bottom 14 and the seat back 16 are positioned to obstruct operational access to a user operational component on the instrument panel 26.

As discussed in more detail below, the locking assembly 34 can be configured to perform a manual locking operation to lock the seat bottom 14 while the seat bottom 14 is in the forward position FP and the seat back 16 while the seat back is in the first position P1. The locking assembly 34 also can be configured to perform an automatic locking operation to lock the seat bottom 14 while the seat bottom 14 is in the forward position FP and the seat back 16 while the seat back is in the first position P1. Naturally, the locking assembly 34 can have both the manual and automatic locking capabilities for locking either or both the seat bottom 14 and the seat back 16 manually or automatically. The locking assembly 34 can further be configured to manually or automatically lock both the seat bottom 14 and the seat back 16 when either or both of the seat bottom release 28 and the seat back release 32 is operated.

The locking assembly 34 can be configured to perform the automatic locking operation in response to closing of a door of the vehicle 10. The locking assembly 34 can also be configured to perform the automatic locking operation in response to an operation of a control switch 36, which can be on the instrument panel 26, on the seat bottom 14 or the seat back 16, on a wireless key 38, or at any other suitable location. The control switch 36 can be manually operated, voice operated, or operated in any other suitable manner, such as by fingerprint recognition or any other known functionality.

The locking assembly 34 is further configured to unlock the seat bottom 14 to enable the seat bottom 14 to move along the seat bottom travel path T and to unlock the seat back 16 to enable the seat back 16 to pivot along the seat back pivot path P. This unlocking operation can be performed manually, automatically, or as a combination of manual and automatic operations as discussed above for locking the seat bottom 14 and the seat back 16. For instance, the locking assembly 34 can automatically unlock the seat bottom 14 upon the seat bottom release 28 being operated to the released condition and can automatically unlock the seat back 16 upon the seat back release 32 being operated to the released condition. Also, the locking assembly 34 can be configured to manually or automatically unlock both the seat bottom 14 and the seat back 16 upon operating only one of the seat bottom release 28 and the seat back release 32.

Figure 4:
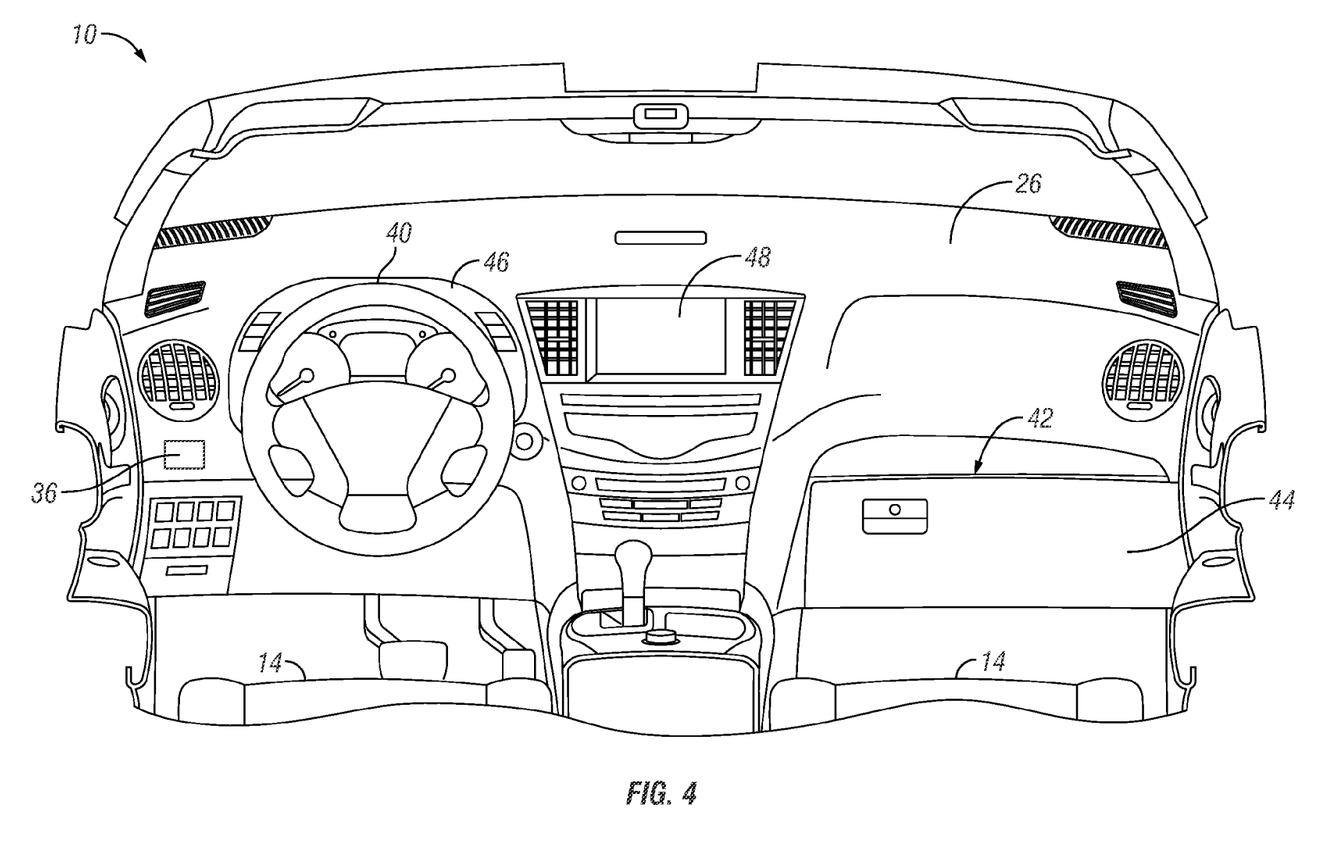
FIG. 4 is a front view of an instrument panel of a vehicle equipped with a vehicle seat assembly for theft prevention according to a disclosed embodiment.

That is, as shown in more detail in FIG. 4, a typical instrument panel 26 includes a steering wheel 40, a glove box 42 having a glove box door 44, an instrument cluster 46, an entertainment system 48 and other components as understood in the art. For purposes of this description, the term "user operational component" can refer to the steering wheel 40 individually and the glove box 42 (or the glove box door 44) individually. The term "operational access" can individually refer to as the type of access to the steering wheel 40 that enables a user to operate the steering wheel 40 to drive the vehicle 12 in a normal manner. Also, the term "operational access" can individually refer to as the type of access to the glove box 42 or the glove box door 44 that enables a user to open the glove box door 44 to gain access to the interior of the glove box 42 in a normal manner. These features and functionality can be better understood with reference to FIGS. 5 and 6.

That is, as shown in FIGS. 5 and 6, the locking assembly 34 is locking the seat bottom 14 while the seat bottom 14 is in the forward position FP. Therefore, the seat bottom 14 obstructs operational access to the user operational component on the instrument panel 26. The locking assembly 34 also is locking the seat back 16 while the seat back 16 is in the first position P1 such that the seat back 16 obstructs operational access to the user operational component on the instrument panel 26. Thus, the locking assembly 34 is locking the seat bottom 14 while the seat bottom 14 is in the forward position FP and the seat back 16 while the seat back 16 is in the first position P1 such that the seat bottom 14 and the seat back 16 cooperatively obstruct operational access to the user operational component on the instrument panel 26.

Referring to the example shown in FIG. 5, the user operational component is the steering wheel 40. Thus, the locking assembly 34 is locking the seat bottom 14 while the seat bottom is in the forward position FP and the seat back 16 while the seat back 16 is in the first position P1 such that the seat bottom 14, the seat back 16, or the seat bottom 14 and the seat back 16 obstruct operational access to the steering wheel 40. As indicated in FIG. 5, a line A extending in a height direction H of the vehicle 10 passes through the upper seat bottom surface 18 and the forward seat back surface 30. Thus, the seat bottom 14 and the seat back 16 basically envelope the steering wheel 40.

Referring to the example shown in FIG. 6, the user operational component is the glove box 42 or the glove box door 44. Thus, the locking assembly 34 is locking the seat bottom 14 while the seat bottom 14 is in the forward position FP and the seat back 16 while the seat back 16 is in the first position P1 such that the seat bottom 14, the seat back 16, or the seat bottom 14 and the seat back 16 obstruct the glove box door 44 from opening to a position which enables access to an interior of the glove box 42. It can be appreciated from this example that the seat bottom 14 blocks opening of the glove box door 44 either entirely or only allows the glove box door 44 to at best open by a slight amount with is insufficient for any sized human hand to gain access to the interior of the glove box 42. The seat back 16 further obstruct assess to the glove box 42, especially from above the glove box 42.

Figure 7:
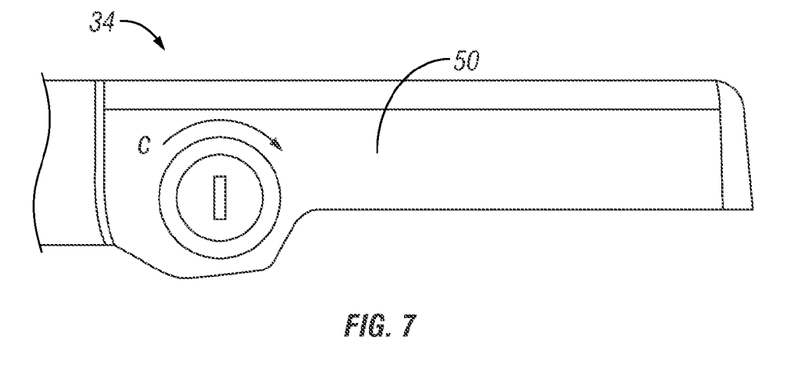
Figure 8:
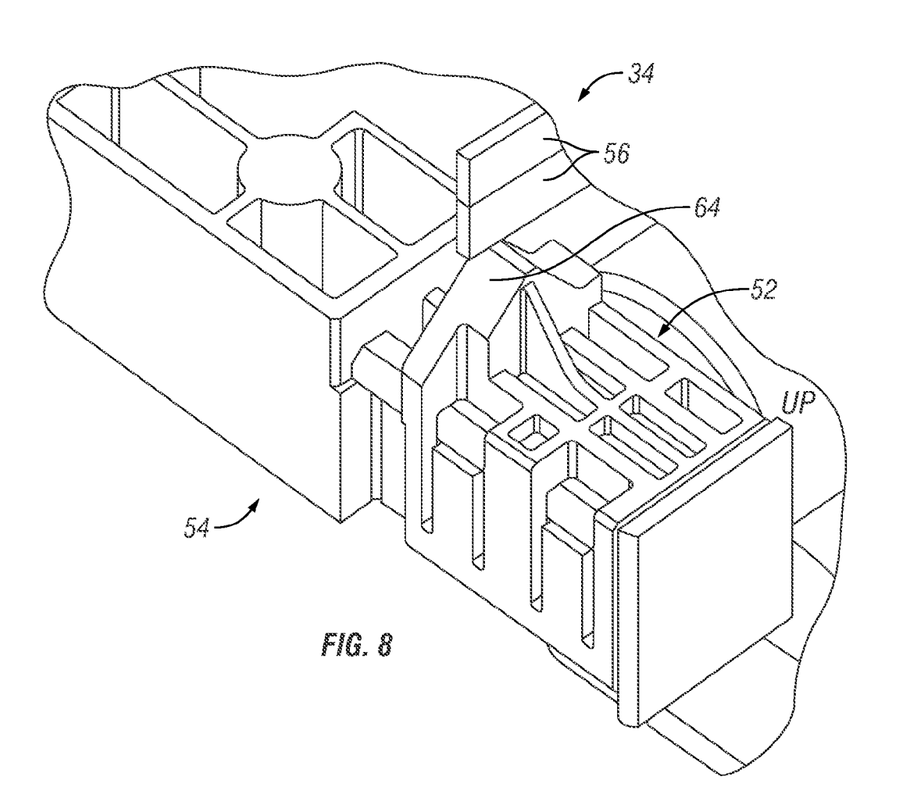
Figure 9:
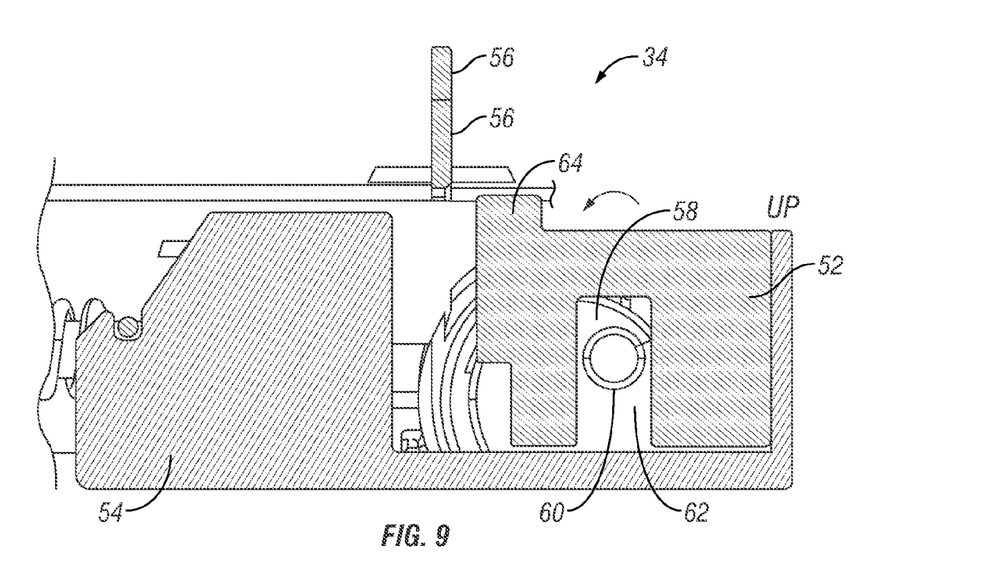
Figure 10:
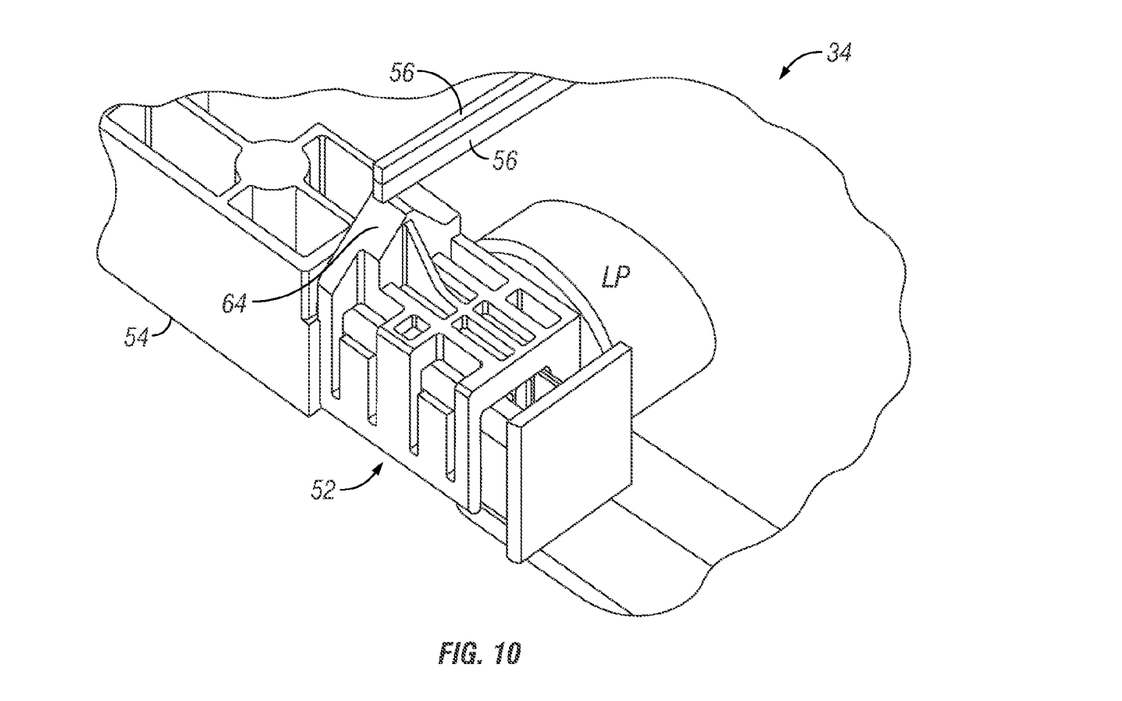

A more detailed example of a manual configuration of the locking assembly 34 is shown in FIGS. 7 through 11. FIG. 7 illustrates an exemplary plan view of a key assembly 50 that is configured to operate the locking assembly 34 to perform the manual locking operations as discussed above. As shown in FIGS. 8 through 10, the locking assembly 34 can include a locking mechanism 52 that is slidably secured to a track assembly 54. FIG. 8 illustrates the locking mechanism 52 positioned in the unlocked position UP in which the locking mechanism 52 does not obstruct movement of a restriction mechanism 56 that can releasably prevent releasing movement of the seat bottom release 28 and the seat back release 32.

As shown in FIG. 9, the key assembly 50 can include a cam arrangement 58 having a projection 60 that engages with a slot 62 in the locking mechanism 52 to move the locking mechanism 52 along the track assembly 54 between the unlocked position UP and the locked position LP which is shown in FIG. 10 when the key assembly 50 is rotated. In the locked position LP, an obstruction portion 64 of the locking mechanism 52 obstructs movement of the restriction mechanism 56 to move in a releasing direction.

Figure 11:
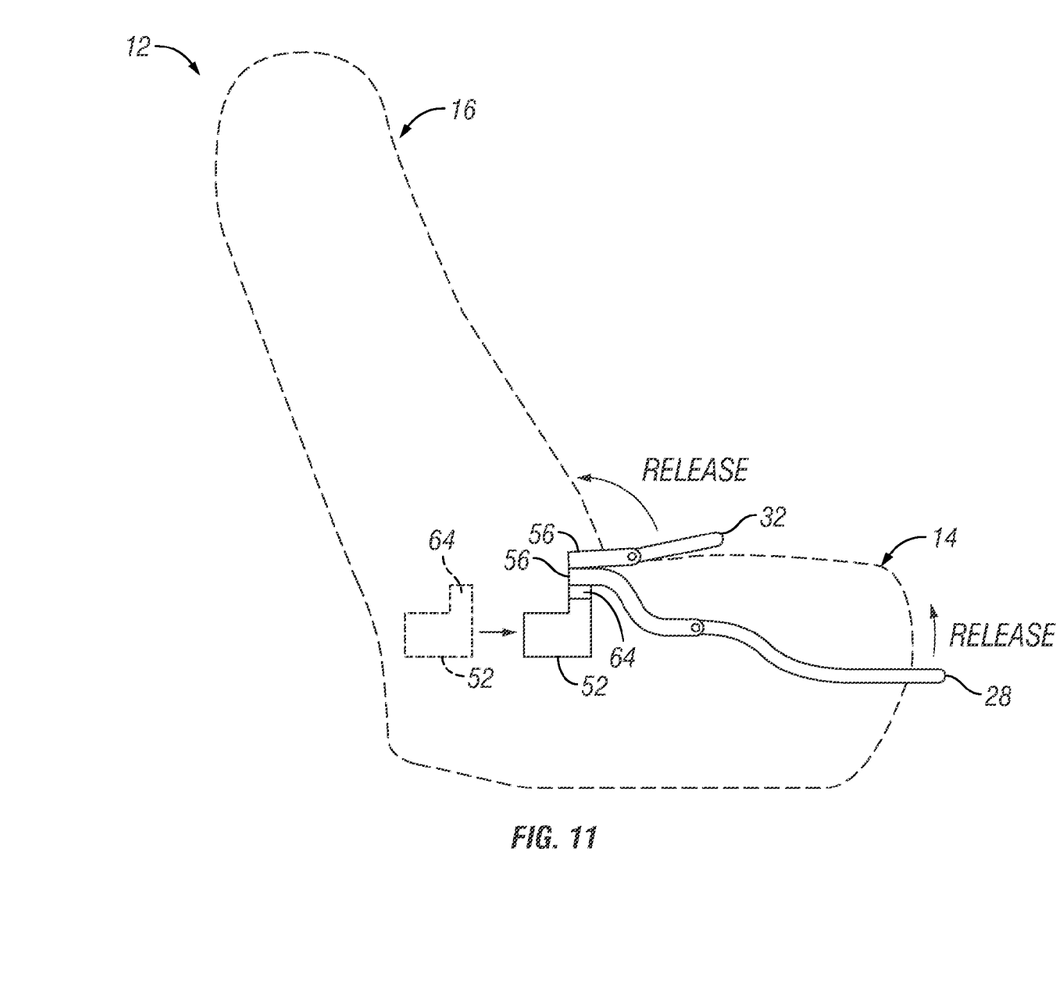
FIG. 11 is a plan view illustrating an example of engagement of the locking mechanism with components of the seat bottom and seat back to lock the seat bottom and the seat back in the positions as shown in FIGS. 5 and 6.

As shown in an exemplary manner in FIG. 11, the restriction mechanism prevents movement of the seat bottom release 28 and the seat back release 32 to prevent release, and thus unlocking, of the seat bottom release 28 and the seat back release 32. In this example, the obstruction portion 64 obstructs movement of the restriction mechanism 56 of the seat bottom release and the restriction mechanism 56 of the seat back release 28 to prevent the seat bottom release 28 and the seat back release 32 from rotating in the "Release" direction. It should be noted that the arrangement of the two restriction mechanisms 56 is for illustrative purposes and is not intended to indicate that the restriction mechanisms 56 must be arranged with respect to each other, and with respect to the obstruction portion 64, in the illustrated manner. Thus, the obstruction portion 64 is configured to obstruct movement of the seat bottom 14 from the forward position along the seat bottom travel path T while the locking assembly locks the seat bottom 14 in the forward position FP. The obstruction portion 64 is also configured to obstruct pivoting of the seat back 16 from the first position P1 along the seat back pivot path while the locking assembly 34 locks the seat back 16 in the first position P1. Accordingly, the locking assembly 34 is configured to prevent changing of the seat bottom release 28 from the set condition to the released condition to prevent the seat bottom 14 from moving out of the forward position FP while the locking assembly 34 locks the seat bottom 14 in the forward position FP. Likewise, the locking assembly 34 is configured to prevent changing of the seat back release 32 from the set condition to the released condition to prevent the seat back 16 from pivoting out of the first position P1 while the locking assembly 34 locks the seat back 16 in the first position P1.

Upon rotating the key assembly 50 in the opposite direction, the cam arrangement 58 moves the locking mechanism 52 along the track assembly 54 between the locked position LP and the unlocked position UP which is shown in FIG. 8. Thus, the locking assembly 34 permits the seat bottom release 28 and the seat back release 32 to change from the set condition to the released condition to allow the seat bottom 14 to move out of the forward position FP and to allow the seat back 16 to move out of the first position P1. Naturally, the locking assembly 34 could be configured in any suitable manner, such as to have one or more obstruction portions 64 positioned, for example, along the seat rails 24 to prevent movement of the seat bottom 14 along the seat rails 24, and to have one or more obstruction portions 64 positioned to directly engage with the seat back 16 to prevent movement of the seat back 16 as understood in the art.

Figure 12:
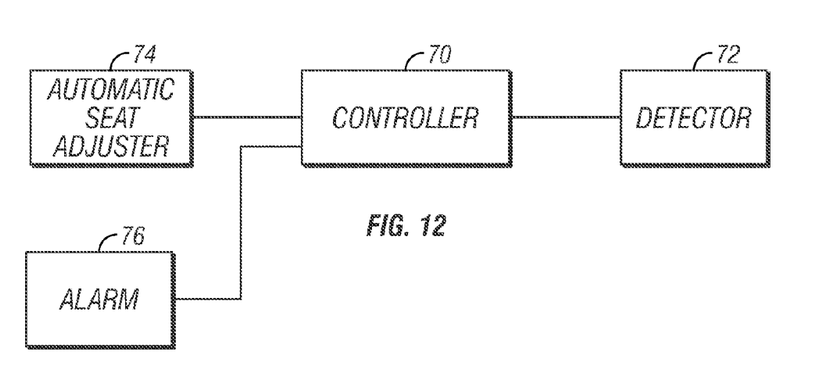
FIG. 12 is a block diagram illustrating an example of a system for electronically adjusting and locking the seat bottom and seat back to lock the seat bottom and the seat back in the positions as shown in FIGS. 5 and 6.

As further shown in FIG. 12, the vehicle seat assembly 12 can include a controller 70 for performing the automatic operations discussed above. The controller 70 can be part of the controller of the vehicle 10 or a separate controller, and preferably includes a microcomputer with a control program that controls the seat bottom release 28, the seat back release 32 and the locking assembly 34 to perform the operations discussed herein. The controller 70 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 70 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 70 can communicate with the other components of the vehicle 10 discussed herein in any suitable manner as understood in the art.

The controller 70 can be coupled to a detector 72 in any suitable manner, such as by wiring or wirelessly. The detector 72 can detect signals from the control switch 36 as discussed above either wirelessly or via a wired connection. Thus, the controller 70 can receive these signals from the detector 72 to control the features of the vehicle seat assembly 12 to perform the automatic operations discussed herein in any suitable manner as would be understood in the art. For example, the controller 70 can control an automatic seat adjuster 74 to control movement of the seat bottom 14 and the seat back 16, and locking of the seat bottom 14 and the seat back 16, as discussed herein as understood in the art. The controller 70 can also control a motor (not shown) to automatically move the locking mechanism 52 to perform the locking an unlocking operations discussed herein. The controller 70 can further be connected to an alarm 76, such as an alarm system of the vehicle 10, to convey an alarm condition, such as an audio and/or visual alarm as well as a notification to authorities, upon application of a force to the seat bottom 14, the seat back 16, or both, while the locking assembly 34 locks either or both the seat bottom 14 and the seat back 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat assembly comprising:
    a seat bottom having an upper seat bottom surface facing toward an interior roof of a vehicle and movably coupled to an interior floor of the vehicle to move along a seat bottom travel path in a longitudinal direction of the vehicle between a forward position and a rearward position, the forward position being closer to an instrument panel of the vehicle than the rearward position;
    a seat bottom release configured to change between a released condition that enables the seat bottom to move along the seat bottom travel path and a set condition that releasably sets the seat bottom at a location along the seat bottom travel path;
    a seat back having a forward seat back surface and pivotally coupled with respect to the seat bottom to pivot along a seat back pivot path between a first position at which the seat back extends at a first angle with respect to the seat bottom with the forward seat back surface being proximate to and facing the upper seat bottom surface and a second position at which the seat back extends an a second angle, greater than the first angle, with respect to the seat bottom with the forward seat back surface facing the instrument panel;
    a seat back release configured to change between a released condition that enables the seat back to move along the seat back pivot path and a set condition that releasably sets the seat back at a location along the seat back pivot path; and
    a locking assembly configured to lock at least one of the seat bottom while the seat bottom is in the forward position and the seat back while the seat back is in the first position such that at least one of the seat bottom and the seat back obstructs operational access to a user operational component on the instrument panel, the locking assembly being configured to prevent at least one of changing of the seat bottom release from the set condition to the released condition to prevent the seat bottom from moving out of the forward position and prevent changing of the seat back release from the set condition to the released condition to prevent the seat back from pivoting out of the first position.

2. The vehicle seat assembly according to claim 1, wherein
    the locking assembly is configured to lock the seat bottom while the seat bottom is in the forward position such that the seat bottom obstructs operational access to the user operational component on the instrument panel.

3. The vehicle seat assembly according to claim 1, wherein
    the locking assembly configured to lock the seat back while the seat back is in the first position such that the seat back obstructs operational access to the user operational component on the instrument panel.

4. The vehicle seat assembly according to claim 1, wherein
    the locking assembly is configured to lock the seat bottom while the seat bottom is in the forward position and the seat back while the seat back is in the first position such that the seat bottom and the seat back cooperatively obstruct operational access to the user operational component on the instrument panel.

5. The vehicle seat assembly according to claim 1, wherein
    the user operational component is a steering wheel; and
    the locking assembly is configured to lock at least one of the seat bottom while the seat bottom is in the forward position and the seat back while the seat back is in the first position such that at least one of the seat bottom and the seat back obstructs operational access to the steering wheel.

6. The vehicle seat assembly according to claim 1, wherein
    the user operational component is a glove box; and
    the locking assembly is configured to lock at least one of the seat bottom while the seat bottom is in the forward position and the seat back while the seat back is in the first position such that at least one of the seat bottom and the seat back obstructs the glove box from opening to a position which enables access to an interior of the glove box.

7. The vehicle seat assembly according to claim 1, wherein
the locking assembly is further configured to unlock at least one of the seat bottom to enable the seat bottom to move along the seat bottom travel path upon the seat bottom release being operated to the released condition and the seat back to enable the seat back to pivot along the seat back pivot path upon the seat back release being operated to the released condition.

8. The vehicle seat assembly according to claim 1, wherein
the locking assembly is configured to perform a manual locking operation to lock at least one of the seat bottom while the seat bottom is in the forward position and the seat back while the seat back is in the first position.

9. The vehicle seat assembly according to claim 8, wherein
the locking assembly includes a key assembly that is configured to operate the locking assembly to perform the manual locking operation.

10. The vehicle seat assembly according to claim 1, wherein
the locking assembly is configured to perform an automatic locking operation to lock at least one of the seat bottom while the seat bottom is in the forward position and the seat back while the seat back is in the first position.

11. The vehicle seat assembly according to claim 10, wherein
the locking assembly is configured to perform the automatic locking operation in response to closing of a door of the vehicle.

12. The vehicle seat assembly according to claim 10, wherein
the locking assembly is configured to perform the automatic locking operation in response to operation of a control switch.

13. The vehicle seat assembly according to claim 10, wherein
the locking assembly is configured to perform the automatic locking operation in response to operation of a control switch on a wireless key.

14. The vehicle seat assembly according to claim 1, wherein
the locking assembly includes an obstruction portion configured to obstruct movement of the seat bottom from the forward position along the seat bottom travel path while the locking assembly locks the seat bottom in the forward position.

15. The vehicle seat assembly according to claim 1, further comprising
an alarm configured to convey an alarm condition upon application of a force to at least one of the seat bottom and the seat back while the locking assembly locks the at least one of the seat bottom and the seat back.

16. The vehicle seat assembly according to claim 1, wherein
the locking assembly includes an obstruction portion configured to obstruct pivoting of the seat back from the first position along the seat back pivot path while the locking assembly locks the seat back in the first position.

17. A vehicle seat assembly comprising:
a seat bottom having an upper seat bottom surface facing toward an interior roof of a vehicle and movably coupled to an interior floor of the vehicle to move along a seat bottom travel path in a longitudinal direction of the vehicle between a forward position and a rearward position, the forward position being closer to an instrument panel of the vehicle than the rearward position;
a seat bottom release configured to change between a released condition that enables the seat bottom to move along the seat bottom travel path and a set condition that releasably sets the seat bottom at a location along the seat bottom travel path; and
a locking assembly configured to lock the seat bottom while the seat bottom is in the forward position such that the seat bottom obstructs operational access to a user operational component on the instrument panel, and configured to prevent changing of the seat bottom release from the set condition to the released condition to prevent the seat bottom from moving out of the forward position while the locking assembly locks the seat bottom in the forward position.

18. A vehicle seat assembly comprising:
a seat back having a forward seat back surface and pivotally coupled along a seat back pivot path between a first position at which the seat back extends at a first angle with respect to a longitudinal direction of a vehicle in which the seat back is disposed and a second position at which the seat back extends an a second angle, greater than the first angle, with respect to the longitudinal direction with the forward seat back surface facing an instrument panel of the vehicle;
a seat back release configured to change between a released condition that enables the seat back to move along the seat back pivot path and a set condition that releasably sets the seat back at a location along the seat back pivot path; and
a locking assembly configured to lock the seat back while the seat back is in the first position such that the seat back obstructs operational access to a user operational component on the instrument panel, and configured to prevent changing of the seat back release from the set condition to the released condition to prevent the seat back from pivoting out of the first position while the locking assembly locks the seat back in the first position.

* * * * *